June 14, 1960   O. B. SHERMAN   2,940,121
APPARATUS FOR FORMING HOLLOW PLASTIC ARTICLES
Original Filed June 10, 1957

INVENTOR.
ORVILLE B. SHERMAN
BY

United States Patent Office 2,940,121
Patented June 14, 1960

2,940,121
APPARATUS FOR FORMING HOLLOW PLASTIC ARTICLES

Orville B. Sherman, West Orange, N.J., assignor to Owens-Illinois Glass Company, a corporation of Ohio Continuation of application Ser. No. 664,687, June 10, 1957. This application May 1, 1958, Ser. No. 733,784

2 Claims. (Cl. 18—5)

This invention relates to the forming of hollow plastic articles, and particularly to a method of forming hollow plastic articles wherein no trimming of the article is necessary after forming.

In many of the methods currently used to form hollow plastic articles, a length of plastic tubing is extruded or otherwise formed and pinched between the halves of a finishing mold, and the article is formed by applying fluid under pressure to expand the tubing to the walls of the mold. The resultant article has a small nubbin of waste plastic material due to the pinching action of the molds on the tubing, which nubbin must be trimmed to provide the finished article.

It is, therefore, an object of this invention to provide a method of forming hollow plastic articles wherein no trimming of the article is required after forming.

Other objects of the invention will appear hereinafter.

The invention has particular utility when used in conjunction with methods of forming articles wherein the finished neck of the article is formed first, and a length of tubing is formed integral with said neck. When used in conjunction with such methods my invention results in an article that requires no trimming whatsoever. Such a method is disclosed and claimed in my application, titled "Method of Forming Hollow Plastic Articles," Ser. No. 381,436, filed September 21, 1953.

Basically, my method includes the steps of forming a portion of plastic material having a solid cross-section integral with the length of tubing which is used to make the article, and severing the tubing with the integral solid portion from the remainder of the plastic material. An apparatus for performing my method preferably includes an extruder having a mandrel reciprocable therein to permit its retraction within the extruder.

Referring to the accompanying drawings.

Figure 1:
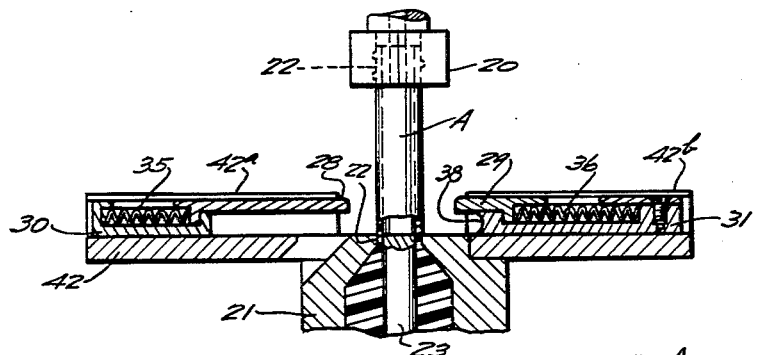
Fig. 1 is a sectional elevation illustrating the general relationship of the several parts of the tube extruding mechanism including the pinching and shearing tool.
Figure 2:
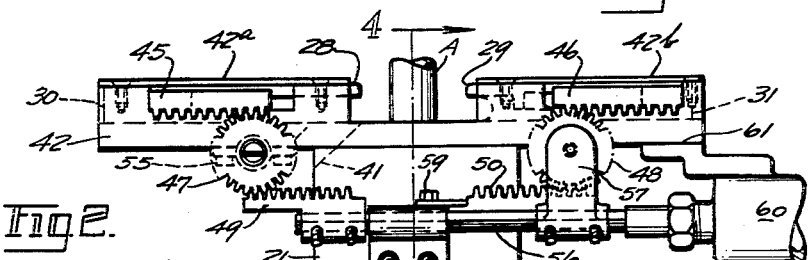
Fig. 2 is a side elevation of the pinching and shearing tool showing its mounting and its actuating mechanism.
Figure 3:
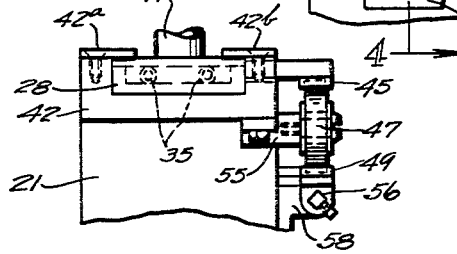
Fig. 3 is an end view of the mechanism of Fig. 2.
Figure 4:
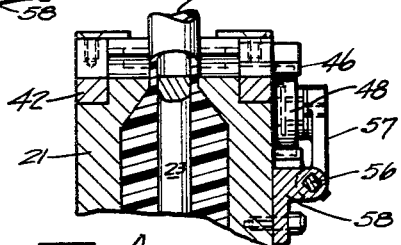
Fig. 4 is a part sectional view taken at line 4—4 on Fig. 3.
Figure 5:
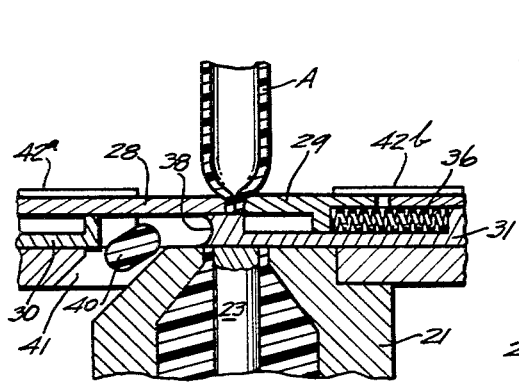
Fig. 5 illustrates the combined pinching and shearing of a tubular form from its source of supply.

Referring to Fig. 1, an apparatus is shown having a partible neck mold 20 vertically reciprocable into and out of contact with an extruder 21. A core 22 is mounted within the neck mold 20. As currently used to perform the method set forth in the aforementioned application, the neck mold 20 is moved into contact with the extruder 21, and the neck of the article is formed by forcing plastic material from the extruder into the cavity of the neck mold. The neck mold is then moved vertically and axially away from the extruder, and plastic material in the form of a tube is extruded integral with the neck. The integral neck and tubing are then enclosed in a mold and expanded to the confines of the mold by applying fluid under pressure through the core 22. The length of tubing may be severed before or after the closing of the molds. In this method, the tubing is pinched between the halves of the mold forming a nubbin of waste plastic.

According to my invention, a plastic tube is extruded from the extruder orifice to the desired length, pinched, and severed from the source of supply and thus results in a completed, sealed tubular blank or parison which can be completely enclosed in a blow mold without being pinched by the blow mold halves.

As shown in Figs. 1–7, inclusive, my method may be performed with and by mechanism adapted for coordination in a high speed production cycle.

Figures 6, 7:
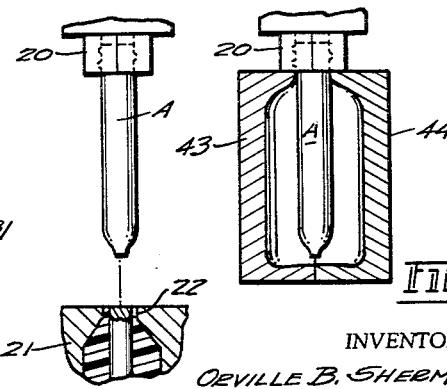
Fig. 6 illustrates the extruded and pinched tube.
Fig. 7 illustrates said pinched tube enclosed in a blow mold preparatory to the final blowing thereof.

The entire mass of plastic material which has been formed may then be entirely enclosed by the halves of a finishing mold 25 (Fig. 6) and expanded to the confines of the mold by applying fluid under pressure through the core 22 (Fig. 7).

The resultant article is in finished form and requires no trimming.

An apparatus for performing the method is shown in Figs. 1 through 7, inclusive, and includes a neck mold 20 vertically reciprocable into and out of contact with an extruder 21. According to this modified method, the neck mold 20 is moved into contact with the extruder orifice 22 to form the neck and subsequently moved away from the extruder orifice to form a length of tubing "A" integral with the neck. The solid or sealed portion on the end of the tubing is formed by sealing or pinching members 28, 29, which have surfaces adapted to meet and pinch the tubing, thereby forming a solid portion 24 on the end of the tubing "A."

With the movement of pinching members 28 and 29 in their guide member 42 to their meeting position and the actual meeting and pinching of the tube, these members are arrested and their holders or supports 30 and 31 continue to move toward each other. During this continued movement the members 28 and 29 are maintained under spring pressure by springs 35 nad 36 individual to each member 28 and 29 respectively.

The holder 31 is formed at its outer end as a shear member 38 and as it continues to move relative to members 28 and 29, it shears the pinched tube along the bottom edge of members 28 and 29 and at the orifice 22. Thus a section 40 of the plastic material is severed and discharged through opening 41 in guide member 42. The pinching members 28 and 29 are then retracted to open position (Fig. 1) and the blow mold halves 43 and 44 are closed about the sealed blank, and blowing air is admitted thereto through the neck mold opening to expand the blank to the blow mold walls.

The actuation of the pinching and shearing mechanism is accomplished as follows: The pinch members 28 and 29 are mounted in the slide member 42 and retained therein by cap members 42ª and 42ᵇ. Attached to the pinch members 28 and 29 are pinion racks 45 and 46 respectively. These racks are in mesh contact with pinions 47 and 48 and these pinions in turn are in mesh contact with further racks 49 and 50.

The pinion 47 is mounted in a stationary bearing 55 attached to the guide member 42 and rack 49 which cooperates with pinion 47, is mounted on a movable piston rod 56. The pinion 48 is mounted in a movable bearing 57 attached to and adapted to move with rod 56. The rack 50 which cooperates with pinion 48, is mounted on a stationary bearing bracket 58 mounted on the extruder 21 and attached as at 59.

An actuating cylinder 60, the actuation of which is under control of the usual machine cycle timer (not shown) is attached to support 42 as at 61. This cylinder is adapted to simultaneously move the piston rod 56, rack 49 and pinion 48, for example, to the left in Fig. 2, thus causing the pinions 47 and 48 to rotate and move the racks 45 and 46 with their respective pinch members 28 and 29 toward each other to pinch the tube "A" as in Fig. 5. As these pinch members meet, their movement is arrested, but the members 30 and 31 continue to move forward, compressing springs 35 and 36, causing the shear edge 38 to sever a portion 40 of the tube "A" from between the orifice 22 and the pinch members 28 and 29.

The cylinder 60 is then reversed and the above described parts move back to their original starting position shown in Fig. 1. These above described steps and actions are then repeated in succession to form successive blanks or parisons "A" from which blown articles are subsequently formed.

The invention has been described as particularly applicable when used in conjunction with the method of forming hollow plastic articles set forth in my aforementioned application, but it should be apparent that my invention has utility in conjunction with other methods, wherein a tubing is formed and expanded to the walls of a mold.

The invention has been described as applicable to thermoplastic materials. The term thermoplastic as used herein defines any organic material which has the required condition of plasticity to permit expansion and setting in predetermined form.

This present application is a continuation-in-part of my application bearing Serial Number 405,569, filed January 22, 1954, and a continuation of my application bearing Serial Number 664,681, filed June 10, 1957, both cases now abandoned.

The term tubing as used herein is intended to include any hollow shapes from which plastic material may be formed, including non-circular and irregular shapes.

Modifications may be resorted to within the spirit and scope of the appended claims.

I claim:

1. In a device for forming hollow tubular parisons for the production of hollow plastic articles, including in combination an extruder and a neck forming mold arranged for cooperative actuation to produce an extruded length of hollow tube extending therebetween, a pair of tube sealing members positioned laterally of each other on opposite sides of said hollow tube, said members arranged over and spaced from said extruder, a shearing device between said extruder and said sealing members, said shear having spaced cutting edges for shearing cooperation with said extruder and said sealing members, respectively, single actuating means for actuating transversely both said sealing and shearing members, and lost motion means to accommodate additional movements of said shearing members after said sealing members have sealingly engaged said tube.

2. In a device for forming hollow tubular parisons for the production of hollow plastic articles, including in combination an extruder and a neck forming mold arranged for cooperative actuation to produce an extruded length of hollow tube extending therebetween, a pair of cushioned sealing members positioned on the lateral opposite sides of said hollow tube, said members arranged above and in spaced alignment with said extruder, a shearing device between said extruder and said sealing members, said shear having spaced cutting edges arranged for shearing contact with both said extruder and one of said sealing members, respectively, means to move concurrently said sealing members and said shearing device into sealing and severing contact with said tube, and lost motion means accommodating further movement of said shearing device to complete the shearing and to eject the sheared portion of said tube lying intermediate said spaced cutting edges.

References Cited in the file of this patent

UNITED STATES PATENTS

| | | |
|---|---|---|
| 2,288,454 | Hobson | June 30, 1942 |
| 2,349,176 | Kopitke | May 16, 1944 |
| 2,349,177 | Kopitke | May 16, 1944 |
| 2,710,987 | Sherman | June 21, 1955 |